United States Patent [19]

Ream

[11] Patent Number: 5,201,482

[45] Date of Patent: Apr. 13, 1993

[54] RAM AIR INFLATABLE GLIDING WING

[76] Inventor: Stanley M. Ream, 20525 Emelita St., Lake Mathews, Calif. 92570

[21] Appl. No.: 785,577

[22] Filed: Oct. 30, 1991

[51] Int. Cl.$^5$ .............................................. B64D 17/02
[52] U.S. Cl. ....................................... 244/145; 244/152
[58] Field of Search .................. 244/142, 138 R, 145, 244/146, 152

[56] References Cited

U.S. PATENT DOCUMENTS

| | | |
|---|---|---|
| 2,546,078 | 3/1951 | Rogallo et al. |
| 3,298,635 | 1/1967 | Barish |
| 3,524,613 | 8/1970 | Reuter et al. |
| 3,558,087 | 1/1971 | Barish |
| 3,724,789 | 4/1973 | Snyder |
| 3,749,337 | 7/1973 | Jalbert |
| 3,809,342 | 5/1974 | Lemoigne |
| 3,893,641 | 7/1975 | Sutton |
| 4,470,567 | 9/1984 | Puskas |
| 4,684,082 | 8/1987 | Gargano |
| 4,705,238 | 11/1987 | Gargano |
| 4,730,796 | 3/1988 | Puskas |
| 4,768,739 | 9/1988 | Schnee |
| 4,771,970 | 9/1988 | Sutton |
| 4,781,343 | 11/1988 | Brown |
| 4,811,920 | 3/1989 | Askwith et al. |
| 4,865,272 | 9/1989 | Schwarz |
| 4,930,726 | 6/1990 | Jalbert |
| 4,930,727 | 6/1990 | Coe |

FOREIGN PATENT DOCUMENTS

| | | |
|---|---|---|
| 336277 | 10/1989 | European Pat. Off. |
| 2614267 | 10/1988 | France |
| 2614268 | 10/1988 | France |
| 2633248 | 12/1989 | France |

OTHER PUBLICATIONS

Poynter, *The Parachute Manual*, copyright 1984, First Edition 1972, Para Publishing, Santa Barbara, Calif.
Parachute Industry Association Publications, PIA Technical Standard 100 paper entitled "Standarized Nomenclature for Ram-Air Inflated Gliding Parachutes", Jan. 23, 1984.

*Primary Examiner*—Galen Barefoot
*Attorney, Agent, or Firm*—Robbins, Dalgarn, Berliner & Carson

[57] ABSTRACT

A RAM air inflatable gliding wing including a plurality of cells interconnected as by stitching along appropriate adjacent side edges thereof. Each of the cells is constructed utilizing an upper and lower flexible member secured together over the entire length thereof. Disposed span wise between and secured to the side edges of the upper and lower flexible members is reinforcing tape preferably carried by a plurality of sections of flexible material. The structure provides airfoil shaped tubes or cells which when in inflated profile is that of shark and cetacean design. An air intake is provided at the leading edge of each of the cells and is constructed including a non-return valve. The reinforcing tape provides a central load network system which provides reinforcement and serves to stabilize the canopy when fully deployed both span wise and chord-wise while at the same time attenuating stress and pressure on the lower surface of the parachute canopy during deceleration.

23 Claims, 4 Drawing Sheets

RAM AIR INFLATABLE GLIDING WING

BACKGROUND OF THE INVENTION

This invention relates generally to a load carrying apparatus which is inflatable from a collapsed configuration to an inflated airfoil configuration by RAM air upon deployment. Such devices have generally been viewed as gliding wing or parachute devices.

The various terminology used throughout this specification will follow the definitions, insofar as they are applicable, as adopted by the Parachute Industry Association in its PIA Technical Standard, adopted Jan. 23, 1984, a copy of which is attached hereto as Appendix A.

RAM air inflatable gliding wings are familiar forms of high glide parachutes in the prior art. These parachutes are characterized by wing type planforms and airfoil type cross sections. Typical canopy embodiment consists of patterned membrane components which in profile emulate the components of conventional airfoil wing design. Emphasis has been to approach a conventional airfoil profile during operation in an effort to optimize glide ratio and ability to carry a heavy load.

High glide parachutes have been developed for: Fire & Rescue Operations, Aerial Supply, Sport Skydiving, Emergency Escape Contingencies and numerous Aerospace and Military applications. These examples require rapid deceleration capability of the parachute system in addition to high glide and load carrying capability. Objectives found in the prior art which enhance glide and ability to carry heavy loads of typical high glide parachutes often limit structural performance of the design and in many instances have increased opening force characteristics which reduce utility or place additional reliance upon external reefing systems to enable parachute deployment capability.

Typical prior art canopy fabrication consists of components which include fabricated upper and lower surface panels which are held in place by internal airfoil dimensioned ribs, series spaced, creating chord wise positioned box-type containment cells. Assembly of components is usually accomplished using interlocking T-beam, I-beam, or half-cell chord-wise techniques along with various sewn seams. Single surface stabilizer panels have been used to terminate canopy wingtip ends attaching below outer airfoil ribs along chord-wise seams. During operation of the parachute, the containment cells become inflated by RAM air conducted by openings along the leading edge. Containment cells are able to pressure equalize by means of crossport cutouts made through the airfoil ribs. Vertical or diverging stress tapes are commonly utilized on airfoil ribs selected for flight load attachments. Such tapes extend upwardly from desired suspension attachment points and terminate just beneath the upper surface panel fabric. Suspension loops are sewn onto airfoil rib seams with suspension line connection accomplished by tying the lines onto the loops and securing the ends of line with stitching. Rigging configuration usually has line connections made to every other rib position across the canopy by span. This results in cells as having an unsupported or non-loaded airfoil rib positioned between cell defining load attachments. Substantially non-stretch suspension lines connect the high glide canopy to a harnessed object or point of load and transfer force. The lines are of precise dimensioned lengths so as to establish optimal trim angle for the canopy along with optimal span wise/chord wise camber profile angles. Generally, the suspension lines are cascaded to reduce drag as well as weight and bulk. Steering and in-flight modulation of aileron effect are accomplished by activation of separate control lines (left and right) which branch off from object location to selected positions along their respective trailing edge connection points.

Typical examples of such structures are shown in the PIA Technical Standard 100, Appendix A and also in U.S. Pat. Nos. 3,524,613, 3,558,087, 3,749,337, 3,893,641, 4,470,567, 4,705,238, 4,730,796, 4,771,970, 4,811,920, 4,865,272, 4,930,726. In addition to the foregoing U.S. Pat. Nos., the following foreign patents also disclose similar structures: French Patent 2 614 267, issued Oct. 28, 1988; European Patent 0 336 277, issued Mar. 29, 1989; French Patent 2 633 248, issued Dec. 29, 1989 and French Patent 2 614 268, issued Oct. 28, 1988.

RAM air inflatable wings or parachutes commonly utilize openings along the leading edge to provide direct inflation access to the containment airfoil section of the canopy. Inflation, deflation, and reinflation of the containment section may be accomplished in rapid sequence using this construction. In some instances, high glide parachutes have utilized openings along the leading edge and/or on the lower surface along with non-return valves to prevent containment section deflation during various inflight conditions or events. Examples of such structures are shown particularly in U.S. Pat. No. 3,558,087 and the European and French Patents above-identified.

Non-return valves serve to dampen containment response to reduced pressure events by blocking openings thus preventing escape of containment pressure from within the containment section. Due to pressure leakage through the sewn seams and fabric permeability, this effect is transient but can permit flight continuation beyond sudden events which can interrupt the flight of canopies which are not equipped with such non-return valve designs. Structures utilizing non-return valve configurations found in the prior art can be exposed to additional force and stress loads from events of substantial pressure environments such as a parachute deployment. Substantial pressure events can result in over-pressurization of the containment section. Size and/or placement reductions made to non-return valve structures in an effort to combat over-pressurization can adversely affect inflation or reinflation needs.

While the structures disclosed in the foregoing prior art references function adequately in many operational circumstances, it has been found that a great need still exists for a RAM air inflatable wing or high glide parachute that exhibits even better safety, strength, stability and maneuverability than the devices disclosed in the prior art. It has been found that the prior art devices do not adequately maintain their proper airfoil shape under all operational conditions. This inadequacy is caused primarily from induced airfoil distortions resulting from applied loads impacting the canopy at the point of line attachment. This condition, as well as the typical open leading edge, produces less efficient airfoil performance due to induced drag. As above described, prior art devices utilize conventional ribs and surface skins to form a plurality of interconnected box-shaped hollow tubes each of which, when filled with air, try to become rounded and distorted. This coupled with the load attachment point distortion results in varying and reduced airfoil efficiency. Utilizing prior art devices of the type above-disclosed, precise maneuvers of the type contemplated during sport parachuting are hindered by the less than optimal airfoil configuration of the canopies.

In addition to the foregoing, the maximum velocity at which the presently known RAM air inflated wings or parachutes can be deployed is limited by the load-bearing capability and excessive force generating characteristics thereof. Prior art devices must be reefed or prevented from excessively rapid inflation in order to lower forces experienced by the load. Possible destructive or catastrophic damage to the device limits its deployment airspeed capability or the velocity decay ratio usage.

SUMMARY OF THE INVENTION

A RAM air inflatable gliding wing or parachute constructed in accordance with the principles of the present invention provides an extremely strong structure which exhibits a high degree of self attenuating ability during the deceleration/inflation process. This allows it to be used in greater transitory situations than prior art devices. The parachute of the present invention is faster flying, has a higher lift-to-drag ratio, is extremely stable and maneuverable, when compared to prior art devices, and is capable of sustaining a surprisingly large loading. The increased stability, maneuverability and loading is achieved through elimination of the traditional ribs and by forming the parachute through utilization of a plurality of interconnected airfoil shaped tubes or cells each of which deploys at predetermined positions internally thereof span-wise disposed reinforcing tape secured to the side edges of the tubes. Such positioning of the reinforcing tape provides structural integrity and shock attenuation as well as a stiffener for the wing during the flight thus providing greater stability and maneuverability. In addition, the utilization of the reinforcing tape permits the tape to absorb the load force during deployment thus removing the load from the top surface of the parachute, which loading, as is well known in the prior art, can cause separation of the top surface.

A RAM air inflated gliding wing constructed in accordance with the present invention includes a leading edge and a closed trailing edge and is constructed from a plurality of interconnected airfoil shaped tubes or cells. Each of the interconnected cells includes an upper and lower surface each having side edges which are secured together over the entire length thereof. An air intake is provided at the leading edge and reinforcing tape is disposed span-wise between and secured to the side edges of the upper and lower surfaces.

The airfoil of the present invention is in dimensional proportional inflated profile that of shark and cetacean design. Cell profile during deployment and deceleration is multi-cambered; when the parachute slows momentum and inflates to an inflight configuration, it then becomes fusiform multicell.

DETAILED DESCRIPTION

A RAM air inflatable gliding wing constructed in accordance with the principles of the present invention provides a structure which is useful in many different applications, for example as a parachute, a wing for ultralight aircraft, a parafoil for cargo drops, paragliding, hang gliders and the like. For purposes of simplicity of illustration and description, however, the following specification will be limited to a description of a RAM air inflatable parachute of the type typically used for sport parachuting activities such as skydiving. The parachute as illustrated and described herein provides an airfoil of substantially rectangular planform which is very stable and highly maneuverable when in its inflated condition. At the same time, the parachute is constructed of flexible material enabling it to be folded and appropriately packed and carried in a convenient manner. As used throughout the specification and claims, the term flexible is intended to mean flexibility in the cloth or plastic film sense and is not intended to embrace the flexibility of a steel spring or aluminum airplane skin. It should further be understood that the term inflation as used herein refers to the development of a parachute in flight and the structural relationship thereof when acted upon by the balance of forces and does not refer to inflation of a pneumatic device in the sense of an automobile tire being inflated.

Figure 1:
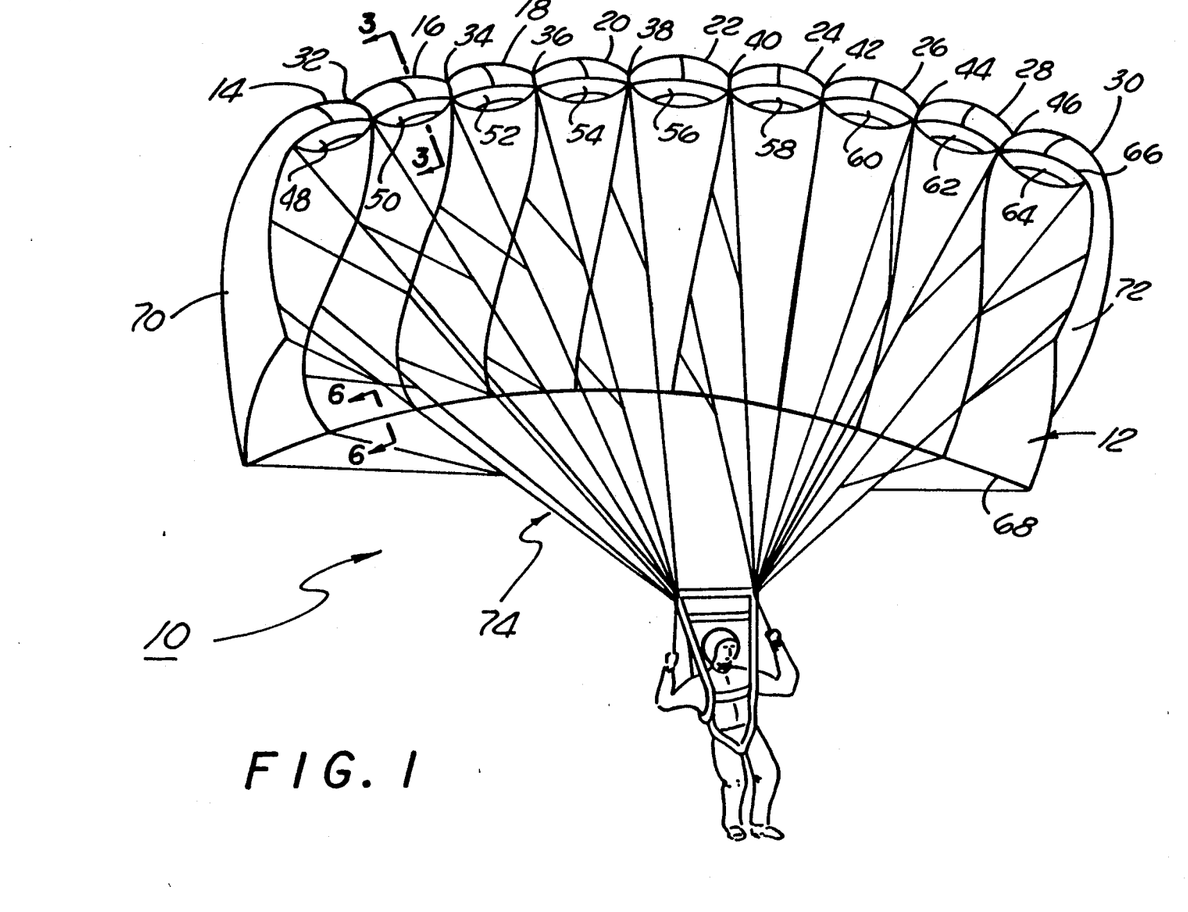
FIG. 1 is a schematic diagram showing a RAM air inflatable gliding wing in the form of a parachute fully deployed and supporting a parachute jumper.

A RAM air inflatable parachute as constructed in accordance with the present invention is illustrated generally at 10 in FIG. 1 to which reference is hereby made. As is shown, the parachute 10 includes a canopy 12 which is constructed from a plurality of cells 14 through 30. Adjacent cells are interconnected as by stitching along appropriate adjacent side edges as shown at 32 through 46. Air intakes are provided as shown at 48 through 64 adjacent the leading edge 66 of the canopy 12. The trailing edge 68 of the canopy 12 is closed as is well known in the prior art. As will be more fully described hereinafter, the air intakes 48 through 64 each include an opening, in the non-fully inflated condition, which is reminiscent of the configuration of a shark mouth and which allows entry of air into each of the cells 14 through 30, independently; but, when fully inflated, includes a flexible member which closes the mouth and assists in providing a closed curve leading edge of the airfoil of the canopy 12. Air inflatable stabilizer panels 70 and 72 are affixed to and extend downwardly from the cells 14 and 30, respectively.

Suspension lines as illustrated generally at 74 are connected by appropriate stitching (as will be described more in detail hereafter) to the canopy along the cell interconnection lines 32 through 46, as is illustrated, as well as to the lower edge of the stabilizer panels 70 and 72. As is well known in the art, the suspension lines 74 may pass through appropriate slider grommets and are connected to risers which in turn are connected to the harness worn by the parachutist. Due to the increased strength of the parachute, it is less dependent on the reefing means. The parachute design of the present invention is such that the increased strength and self attenuating design will allow for minimizing slider size and/or eliminating or employing alternative reefing means.

Figure 2:
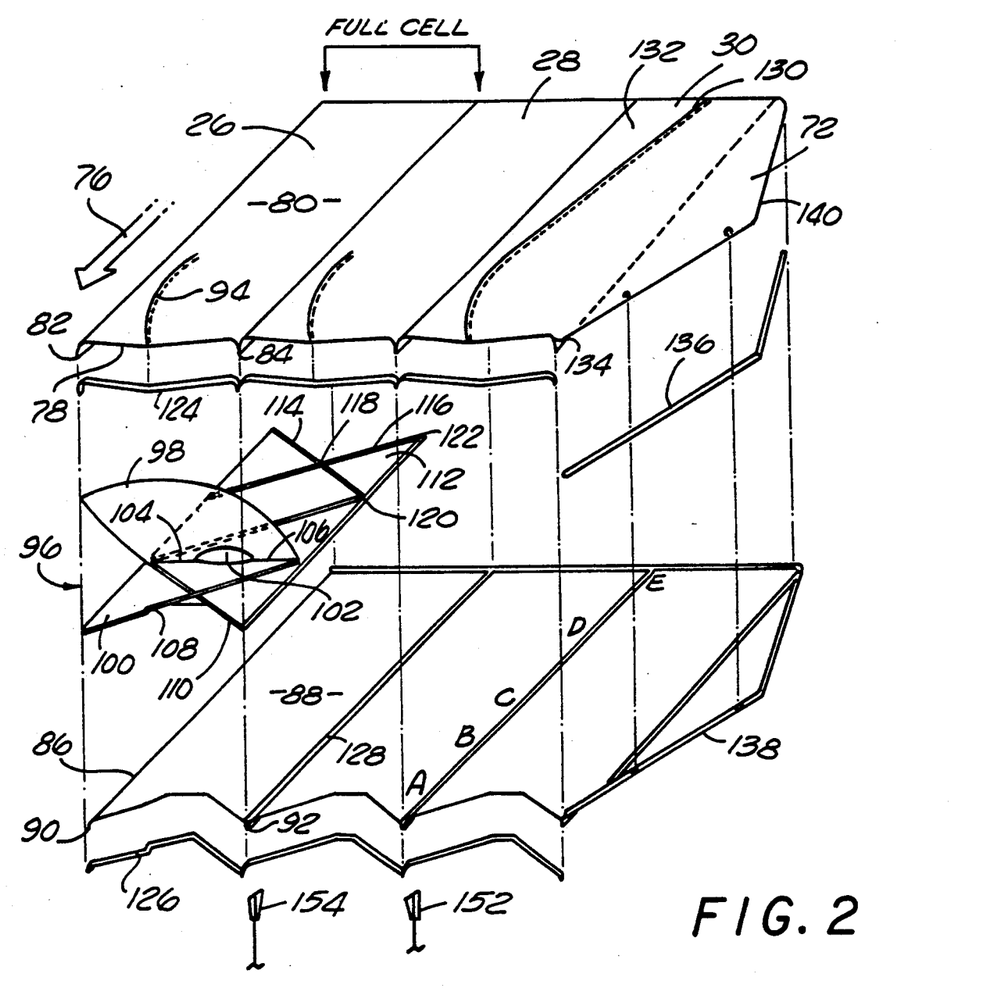
FIG. 2 is an exploded view illustrating various components of a fragmentary portion of the gliding wing as shown in FIG. 1.

By reference now more particularly to FIG. 2, additional details of the construction of the canopy 12 as illustrated in FIG. 1, may be understood. As is illustrated in FIG. 2, which is a fragmented forward quarter chord section of the cells 26, 28 and 30, are shown in an exploded non-interconnected form. The direction of flight of the parachute when fully deployed would be as illustrated by the arrow 76. Each of the cells 14 through 30 is constructed from a first flexible member 78 defining a surface 80 and having side edges 82 and 84. Also included is a second flexible member 86 defining a lower surface 88 having side edges 90 and 92. Each of the upper flexible members 78 include a cut out portion, the edges of which are stitched together as illustrated at 94 to provide the upper curved surface for the upper portion of the leading edge of the cell.

Disposed between the first and second members 78 and 86 is a means 96 for providing an air intake for the cell. The means 96 includes flexible upper and lower jaws 98 and 100 with a throat or opening 102 provided at the after edges thereof which may be partially stitched together as shown at 104 and 106. This structure provides a conically-shaped interior nozzle for air flow into the cell. Reinforcing tape 108-110 is affixed to the lower jaw 100 while preferably the upper jaw 98 is constructed of flexible material without such reinforcing tape thereon.

In addition to the foregoing and spaced chord wise, aft of the opening 102 of the air intake 96 is an additional member or mid surface 112 preferably of flexible material upon which there is attached reinforcing tape 114 and 116. In the preferred embodiment, the mid surface 112 is approximately 2%-7% smaller than the lower surface 88 to provide optimal loading and the desired inflated profile. It should be understood that the reinforcing tape is carried by the mid surface flexible material 112. However, under certain circumstance and depending upon the application, the mid surface flexible material 112 may be dispensed with and the reinforcing tapes 114-116 may be disposed within the structure at the appropriate place and, secured at opposite ends to the side edges of the upper and lower surface. If desired, the two tapes may be stitched together at their cross point 118. The member 112 with the reinforcing tape 114-116 disposed thereon provides a reinforcement and serves to stabilize the canopy when fully deployed both span-wise and chord-wise as will be more fully understood by the following description. This structure may be viewed as a central load network system. The tapes 114 and 116 absorb the load which is applied to the canopy upon deployment and further upon the descent of the load affixed thereto. Such is accomplished by affixing the suspension lines at the tape terminal points such, for example, at 120 and 122.

The cross tapes provide the stress distribution network within the parachute structure. Live load transfer and shock attenuation are handled in this system. Through the utilization of the cross tapes, substantially all of the airfoil distortions derived from load input are removed from exterior surface areas. During deceleration, this system shares in exterior surface loading, but also provides needed alignment influences to the entire parachute. A portion of this influence is in the form of providing an opposing force to canopy spread. This network also provides a backing to the undermost airfoil surface in a barrier form. The network is made up of a plurality of flexible shaped members 112 in order to facilitate easy fabrication and to allow for predetermined placements thereof. Cut out portions on opposing ends of adjacent sections are free spanned within the cell chamber and serve to dampen air movement within the cell chambers. The non-cutout portions of each of the members 112 are attached, by stitching, to the sides of the surface chord-wise edges, and are utilized in main seam formation. The members 112 also work in conjunction with the stress distribution network to attenuate stress and pressure on the bottom surface of the parachute during deceleration and work in conjunction with alignment and opposing spread force generation. The member 112 also serves as a carrier for stress tapes used for live load transfer and work within the cells to prevent entanglement of stress tapes with canopy surface structures which could occur during packing or deployment.

Appropriate reinforcing tape such as is shown at 124 and 126 is affixed to the leading edge 66. Reinforcing tape 128 may also be utilized along the adjacent side edges of cells, for example, at 26 and 28. Such reinforcing tape on the side edges may be continuous, intermittent or in some applications deleted entirely. In construction, adjacent cells such as 26 and 28 are assembled with the air intake 96 sewn in place by securing the upper jaw 98 to the upper surface and the lower jaw 100 to the lower surface 88, respectively, at the leading edges and side edges thereof. The upper and lower surfaces with the attached upper and lower jaws, along with the additional flexible member 112, are then assembled with the member 112 disposed at its appropriate position chord-wise. Thereafter, the adjacent side edges of the upper and lower surfaces 80 and 88, respectively, as well as the adjoining side edges of the panel 28, are stitched together along with the upper and lower jaws 98 and 100 and the flexible member 112 to form a contiguous structure. Such stitching occurs throughout and along each of the adjacent edges as shown at 32 through 46 in FIG. 1 to form the plurality of full cells 14 through 30 of the canopy 12. It should be understood that though 9 cells are illustrated in FIG. 1, any number of cells may be utilized depending upon the particular application to which the parachute is to be placed. Typically, more cells would be used in thinner airfoils or airfoils having a higher aspect ratio design while fewer cells would be used in thicker airfoil designs. In some instances, a combination of cell widths may be used in the canopy design.

As is more clearly illustrated in FIG. 2, the stabilizer 72 is affixed to the cell 30 by being stitched at one edge 130 thereof along substantially the central portion of the upper surface 132 of the cell 30. The stabilizer 72 is preferably a two-piece component and includes a folded-under (as viewed in FIG. 2) section which is affixed to the side edge 134 of the upper surface 132 of the cell 30. Appropriate reinforcing tapes 136 and 138, either continuous or intermittent, are affixed to the edge 140 of the stabilizer 72 to which, in turn, suspension lines are affixed as is illustrated in FIG. 1.

Figure 3:
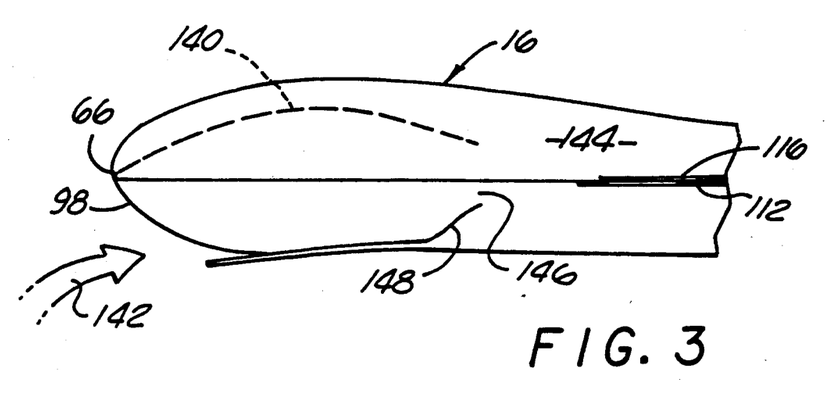
FIG. 3 is a partial cross sectional view taken about the lines 3—3 of FIG. 1 illustrating the air intake of the gliding wing of the present invention.

By referring now more particularly to FIG. 3 which is a fragmentary cross sectional view of the leading edge portion of the cell 16, the air intake structure is illustrated in operation and in further detail. As is therein shown, the upper jaw 98 is in a closed condition and forms an integral portion of the leading edge 66 thereof. Upon initial deployment of the canopy, upper jaw 98 is in the position shown by the dashed line 140. When in this position, air can enter as shown by the arrow 142 into the interior 144 of the cell 16. As is illustrated, the member 112 carrying the reinforcing tape 116, is disposed aft of the opening 146 provided in the inwardly directed converging members 140 and 148 forming the air intake. As the air enters, as shown by the arrow 142, the pressure internally in the interior 144 of the cell 16 increases to a point where it exceeds the pressure exteriorly thereof. The upper jaw 98 moves into position forming the leading edge and closes to an opening size relative to and large enough to maintain cell inflation. In those instances where the pressure drops below that of the containment section, the upper jaw 98 is caused to move from the position shown in the dashed line 140 to the position as shown at 98 thus sealing the interior 144 of the cell 16 preventing the escape of air therefrom.

Figure 4:
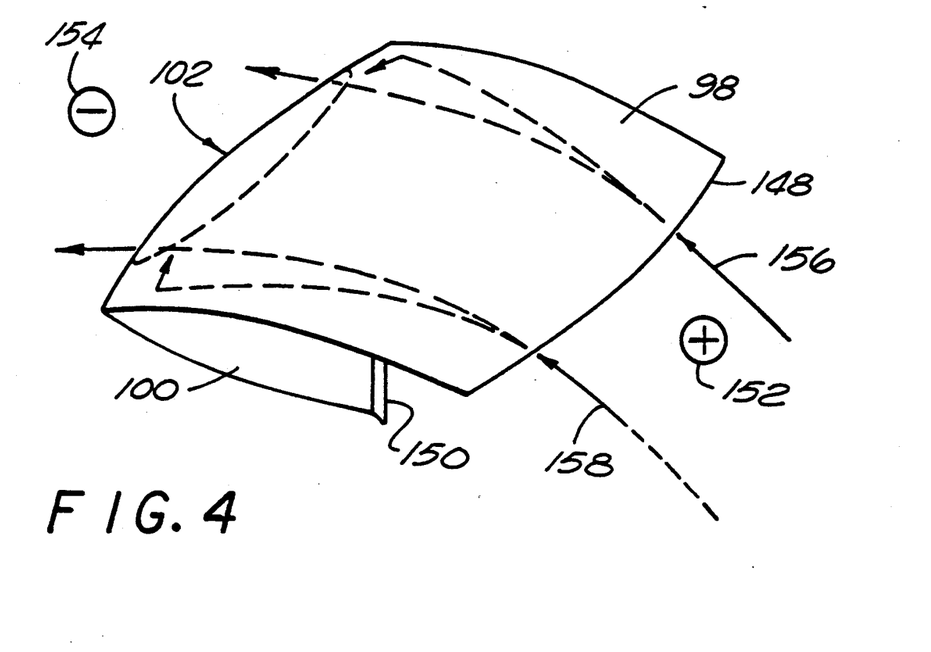
FIG. 4 is a schematic representation illustrating the operation of the air intake during the time air is passing into a cell.
Figure 5:
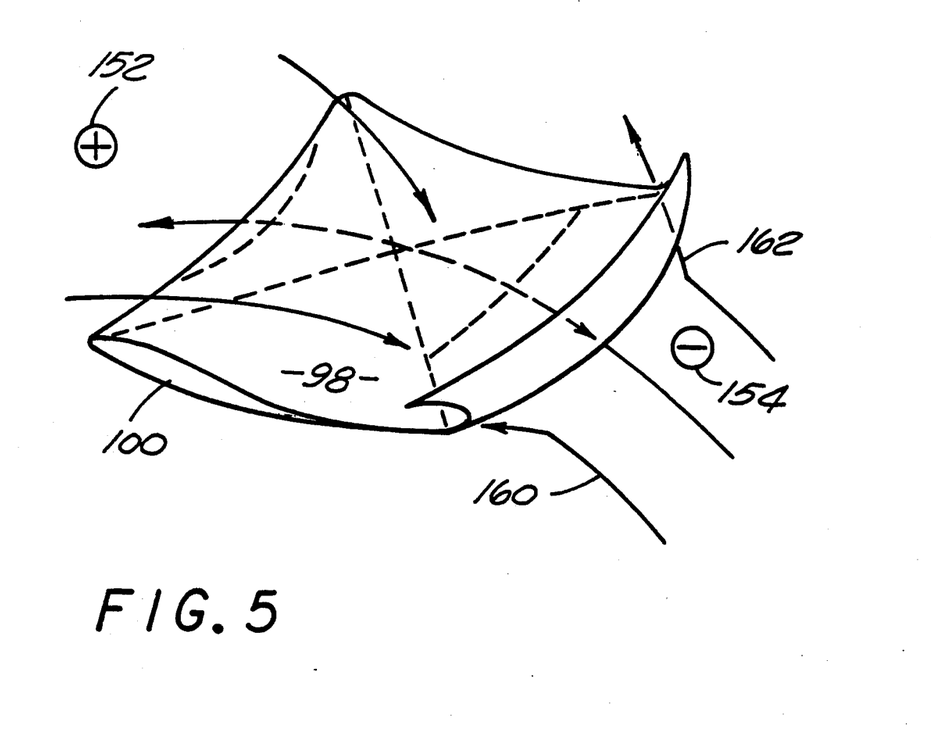
FIG. 5 is a schematic representation similar to FIG. 4 but illustrating the air intake subsequent to the cell being fully inflated.

The operation of the air intake is shown more in detail in FIGS. 4 and 5 to which reference is hereby made. As is therein shown, the upper and lower jaws 98 and 100 of the air intake are shown schematically but disconnected from the cell. It will be understood that the side edges are affixed to the side edges of the cell while the upper edge 148 of the jaw 98 is affixed to the upper edge 78 of the top surface while the front edge 150 of the lower jaw 100 is affixed to the front surface or leading edge of the lower surface 88. The opening 102 is provided so that air may pass therethrough. As long as pressure is more positive at the intake side than at the exit side of the jaw, as is shown by the respective plus and minus signs 152 and 154, air will flow as shown by the arrows 156 and 158 from the exterior through the opening 102 and into the interior of the respective cell. On the other hand, as is shown in FIG. 5, when the pressure becomes more positive at the interior of the respective cell than at the exterior entry as is shown by the respective plus and minuses 152 and 154, the jaw 98 collapses against the jaw 100 and forces the same against the lower surface 88 thereby blocking the flow of air as is illustrated by the deflected arrows 160 and 162. So long as the pressure remains, as shown in FIG. 5, the shark mouth air intake opening is effectively sealed and the configuration of the airfoil remains stable and useable. Thus, when the parachute encounters turbulence or at the time of descent, the airfoil retains its shape and stability.

It should be understood by those skilled in the art that the shark mouth air intake of the present invention may be used in conjunction with prior art devices as well. In terms of function, the shark mouth intake serves three primary needs: (1) absorb, direct and diffuse high velocity air at the intake; (2) leading edge barrier formation to reduce drag; and (3) modulate or regulate cell pressurization.

During deceleration, the upper portion of the shark mouth becomes a baffle, absorbs stress, sending it throughout its shape and into main seams away from the top portion or top skin of the airfoil. In addition, it provides resistance to the cells ability to spread by opposing force. The conical profile of this upper portion of the jaw deflects a percentage of high velocity air at the intake outward away from the mouth while directing a percentage inward to inflate the cell. The innermost portion of this upper jaw provides the upper half of the interior nozzle. By constricting, somewhat, the rate of flow through this area, the filling time for the cell is regulated. This constriction also effects a change as to the entire mouth or inlet angle of attack with regards to relative air flow at the inlet. The interior nozzle area also provides desired directional and pattern flow of high velocity air into the cell chamber.

The lower jaw portion of the mouth, during this phase of canopy development, provides the lower half of the interior nozzle. The first stage of outside to inside air flow pattern development at the leading edge contains the cross tape reinforcement structure which maintains correct alignment of the cut out portion of this lower jaw as well as load attenuation and leading edge orientation to relative flow.

As the parachute slows down and the cells fill with air, the top or upper jaw begins to close. This baffle now becomes the primary outermost leading edge surface. Its deflecting action has changed from an air inlet to that of airfoil formation. Unlike the open leading edge in prior art flexible airfoils, induced drag is significantly diminished by virtue of the now covered leading edge. In addition to being the relative airflow transitory point of the airfoil leading edge, this jaw serves to valve air pressure at the peak pressure point of the inflight airfoil, thus maintaining cell pressurization relative to this point. Sudden pressure reductions at this point cause this valve to seal against pressure loss from within the cells interior. While this effect is variable depending upon materials used in fabrication of the airfoil, it results in enhanced safety. In the event the airfoil has been flown into a stall condition for a duration sufficient to cause collapse of the device, the upper jaw portion is able to open fully to provide rapid reinflation.

Figure 6A:
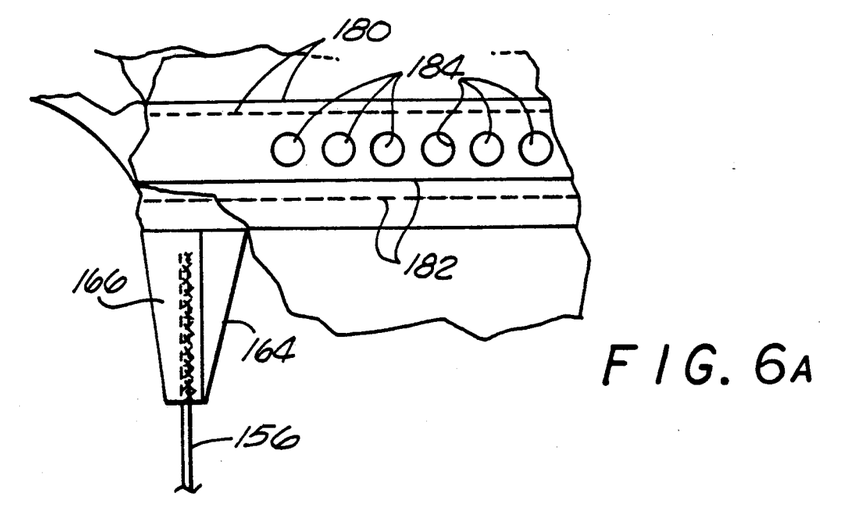
FIGS. 6A and 6B are cross sectional views taken about the line 6-6 of FIG. 1 illustrative of alternative crossport construction of the gliding wing of the present invention.

As shown in FIG. 6A which is taken about the line 6—6 of FIG. 1, the crossport communication between each of the adjacent cells 14 through 30 is illustrated. This crossport construction is accomplished by sewing together the adjacent side edges of the upper and lower surfaces (FIG. 2) of each of the adjacent cells along the entire length thereof. This operation provides an upper stitch 180 and a lower stitch 182 which are spaced apart by a small amount, for example, on the order of one inch. This provides a load bearing seam. Suspension lines attach at selected points along this seam. The seam itself can be viewed as follows: (1) primary load from the suspension lines transfers vertically through stitching into the mid surface cross tape structure; and (2) secondary load from suspension lines transfers chordwise through the chord-wise lower stitch patterns 182. The mid surface and everything below it are live loaded within the seam. In other words, the stitch rows nearest the seam bottom are live loaded, but the stitch rows nearest the seam top or upper surface are not. Cell crossport communication takes place by openings 184 located at selected sites along the chord-wise seam between parallel rows of stitching. This can be a series of small ports as shown in FIG. 6A, or a mesh fabric section, or a slit 186 which disconnects the top surface from the bottom surface separating the main seam into divisions for predetermined short distances.

Figure 7:
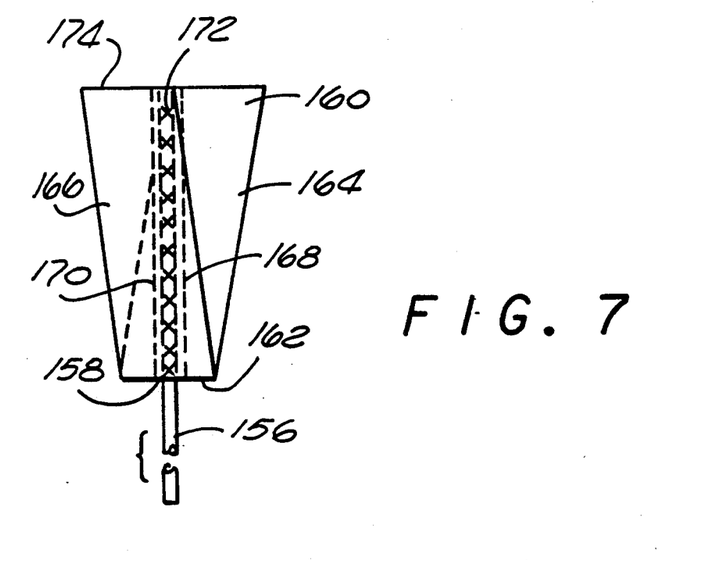
FIG. 7 is a schematic representation illustrating the suspension line attachment in accordance with the present invention.

As is illustrated in FIG. 7, the suspension lines are constructed for attachment along the adjacent side edges interconnecting the cells 14 through 30 as shown at 32 through 46. The suspension lines are attached as is illustrated schematically at 154 and 152 of FIG. 2 at the points A, B, C and D at each of the common interconnecting points or seams 32 through 46 of the adjacent cells 14 through 30.

As is shown more specifically in FIG. 7, the suspension lines 156 are placed through an opening 158 provided in a wide tape 160. The tape is then folded upon itself about the fold line 62 to retain the suspension line therebetween. The suspension line is then held as in a sheath between the two folds 164 and 166 by, for example, appropriate stitching 168 and 170. Additionally, stitching 172 is provided completely through both folds 164 and 166 as well as the suspension line 156. Such construction secures the suspension line 156 to the tape 160. The edge 174 across the top of the folds 164, 166 is then applied at points A, B, C and D, as appropriate, and are stitched in place. As can be seen with the terminal portions 120-122 of the reinforcing tapes 114-116 of adjacent flexible members 112 in adjacent cells being positioned at the points A, B, C and D, the suspension line support 160 is integrally connected to the reinforcing tape in such a manner that the load supplied thereto by the suspension line 156 upon deployment is absorbed fully by the reinforcing tapes 114-116. As a result, the upper surface of the canopy is unloaded as opposed to prior art canopies, thus substantially decreasing the possibility of damage or separation of the top surface upon deployment. In addition, though such construction line strength is maintained, drag is reduced and loading is directed into the mid-surface. However, in the event of a failure whereby the line disconnects from within the sheath, there is little or no damage to the parachute structure.

Figure 6B:
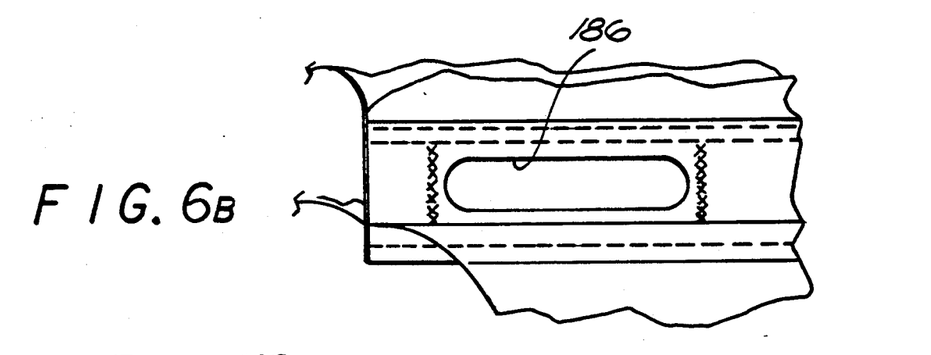

In the event, however, that there is a rupture in the top surface of any of the cells, the speed of forward movement is slowed and the parachutist is alerted. Such occurs because of the crossporting described and as illustrated in FIGS. 6A or 6B, which causes the pressure internally of each of the cells to become equalized and to be lower than the pressure at the leading edge, which as can be seen in FIGS. 1 and 3, at the upper portion of the leading edge thereby causing the shark mouth to open by the upper jaw 98 achieving a position as shown at 140 thus allowing air to pass through the air intake through the crossporting and out at the rupture which has occurred in the particular cell concerned.

What is claimed is:

1. A ram-air inflated gliding wing (10) having a leading edge (66) and a closed trailing edge (68) comprising:
   A. a plurality of interconnected cells (14-30), each of said cells including
   (1) first means (78) defining an upper surface (80) having side edges (82-84);
   (2) second means (86) defining a lower surface (88) having side edges (90-92);
   (3) third means (32-46) for securing said first and second means side edges directly together over the length thereof;
   (4) an air intake (96) at said leading edge; and
   (5) reinforcing tape (114-116) having first and second ends, said tape being disposed span-wise between and secured at said first and second ends to opposed ones of said side edges of said upper and lower surfaces at a pre-selected chord-wise position between said leading and trailing edges.

2. A gliding wing as defined in claim 1 which further includes fourth means defining a middle surface disposed span wise at said pre-selected chord-wise position and secured to said side edges of said upper and lower surfaces, said middle surface carrying said reinforcing tape.

3. A gliding wing as defined in claim 2 wherein said reinforcing tape is secured to said middle surface.

4. A gliding wing as defined in claim 3 wherein said air intake includes
   a flexible valve means which remains open during inflation of said wing and which closes upon the pressure internally of said cell exceeding the pressure externally of said cell at said leading edge.

5. A gliding wing as defined in claim 4 wherein said middle surface defining means is disposed aft of said flexible valve means.

6. A ram-air inflated gliding wing having a leading edge and a closed trailing edge comprising:
   a plurality of interconnected cells, each of said cells including
   (1) first means defining an upper surface having side edges;
   (2) second means defining a lower surface having side edges;
   (3) third means for securing said first and second means side edges together over the length thereof;
   (4) fourth means defining a middle surface disposed span wise at a pre-selected chord-wise position and secured to said side edges of said upper and lower surfaces;
   (5) reinforcing tape disposed span-wise between, and secured to
      (a) said side edges of said upper and lower surfaces, and
      (b) to said middle surface;
   (6) an air intake at said leading edge including a flexible valve means having an inwardly converging hollow flexible member disposed internally of said cell and affixed at one end thereof to said leading edge, said valve remaining open during inflation of said wing and closing upon the pressure internally of said cell exceeding the pressure externally of said cell at said leading edge; and
   (7) said middle surface defining means being disposed aft of said flexible valve means.

7. A gliding wing as defined in claim 6 wherein said converging flexible member is secured along opposite sides thereof to said side edges of said upper and lower surfaces.

8. A gliding wing as defined in claim 7 wherein said converging hollow member includes a larger opening secured to said leading edge and a smaller opening at the opposite end thereof.

9. A gliding wing as defined in claim 8 wherein said middle surface defining means is disposed aft of said smaller opening.

10. A gliding wing as defined in claim 9 wherein that portion of said converging flexible member disposed opposed said lower surface further includes reinforcing tape secured thereto.

11. A gliding wing as defined in claim 9 which includes a plurality of separate middle surface defining means disposed at different pre-selected chord-wise positions, and secured to said side edges of said upper and lower surfaces.

12. A gliding wing as defined in claim 11 wherein each of said cells is interconnected to its adjacent cell by means for securing adjacent side edges chord-wise.

13. A gliding wing as defined in claim 12 wherein the adjacent side edges of said second means are secured along their entire chord-wise length to each other.

14. A gliding wing as defined in claim 13 wherein said side edges of said second means are secured to the side edges of said first means along the chord wise length thereof by spaced apart stitches and which further includes means defining openings for providing crossport communication between said plurality of interconnected cells.

15. A gliding wing as defined in claim 14 wherein said crossport communication is a series of openings disposed between said spaced apart stitches.

16. A gliding wing as defined in claim 14 wherein said crossport communication is a series of slits disposed between said spaced apart stitches.

17. A gliding wing as defined in claim 13 which further includes a stabilizer panel secured to each of the outermost cells of said wing.

18. A gliding wing as defined in claim 17 wherein each of said stabilizer panels is affixed to said respective outermost cell at approximately the midpoint span-wise thereof.

19. A gliding wing as defined in claim 18 wherein said stabilizer panel is also affixed to said side edges of said first and second means.

20. A gliding wing as defined in claim 19 wherein said stabilizer panel includes a layer of flexible material having first and second ends, said first end being secured at said midpoint of said outermost panel and said second end being affixed at said side edges thereof.

21. A gliding wing as defined in claim 20 which further includes a plurality of suspension lines affixed to said side edges of said second means, each of said suspension lines being affixed at a point where a reinforcing tape is secured to said side edge.

22. A gliding wing as defined in claim 21 wherein said suspension line at an end thereof is encased in a sheath-like manner in a flexible material and said flexible material and said suspension line are secured together at said second means.

23. A gliding wing as defined in claim 22 wherein said sheath-like flexible fabric and said suspension line are secured together by stitching therethrough.

* * * * *